United States Patent [19]
Kushiro et al.

[11] Patent Number: 5,647,224
[45] Date of Patent: Jul. 15, 1997

[54] AIR CONDITIONER AND HEAT EXCHANGER THEREFOR

[75] Inventors: Yoshimi Kushiro, Toyota; Hiroki Aoshima, Kariya, both of Japan

[73] Assignee: Aisin Seiki Kabushiki Kaisha, Kariya, Japan

[21] Appl. No.: 580,600

[22] Filed: Dec. 29, 1995

[30] Foreign Application Priority Data

Jan. 19, 1995 [JP] Japan .................................. 7-023264
Mar. 1, 1995 [JP] Japan .................................. 7-065226

[51] Int. Cl.⁶ .............................. F25B 41/00; F25B 1/00
[52] U.S. Cl. ........................ 62/197; 62/114; 62/502
[58] Field of Search ............................ 62/502, 197, 114

[56] References Cited

FOREIGN PATENT DOCUMENTS 0132841  11/1978  Japan .................................. 62/502
40504012  2/1993  Japan .................................. 62/502

*Primary Examiner*—William E. Wayne
*Attorney, Agent, or Firm*—Burns, Doane, Swecker & Mathis, LLP

[57] ABSTRACT

An air conditioner is made to follow up a change in load in an efficient manner by utilizing the fact that the components of a three-component mixed medium serving as a substitute for Freon have different boiling points. The mixed medium, which consists of R-32, R-125 and R-134a, is sealed within the circuit of the air conditioner, and a supercooled heat exchanger and liquid-gas tank are interposed between an outdoor heat exchanger and an expansion valve. The liquid-gas tank is connected to an accumulator via a liquid injection valve.

2 Claims, 4 Drawing Sheets

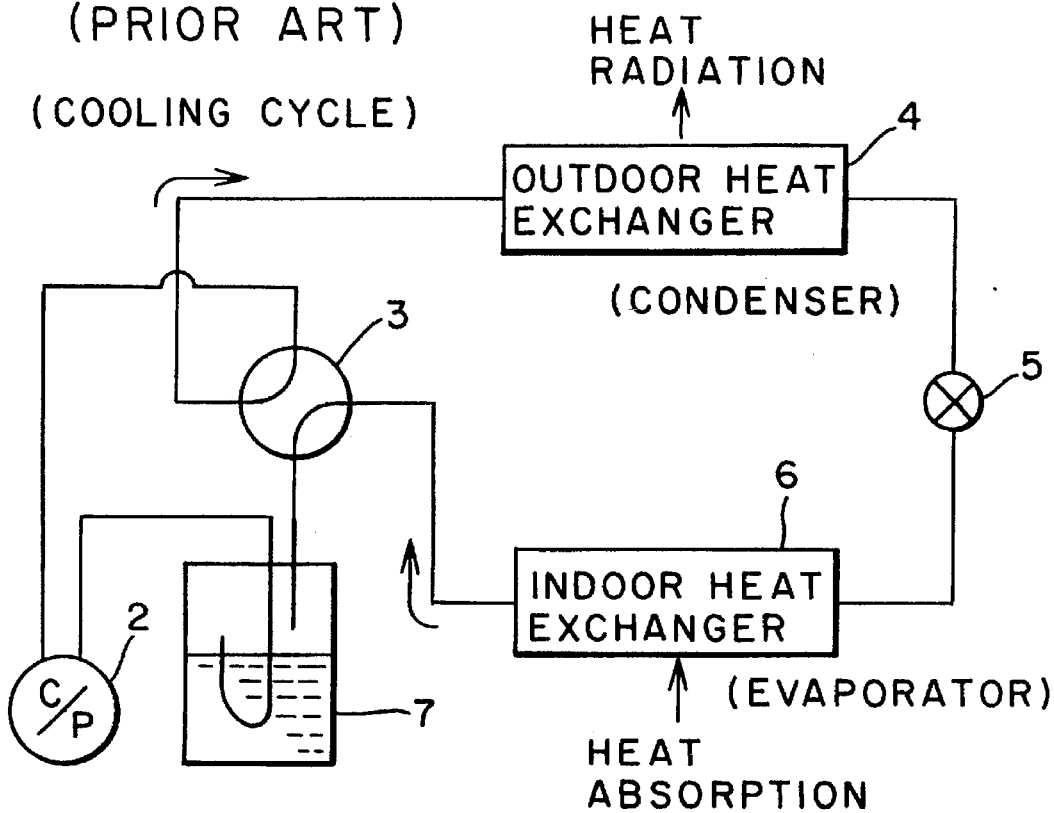
FIG. 4 (PRIOR ART) (COOLING CYCLE)
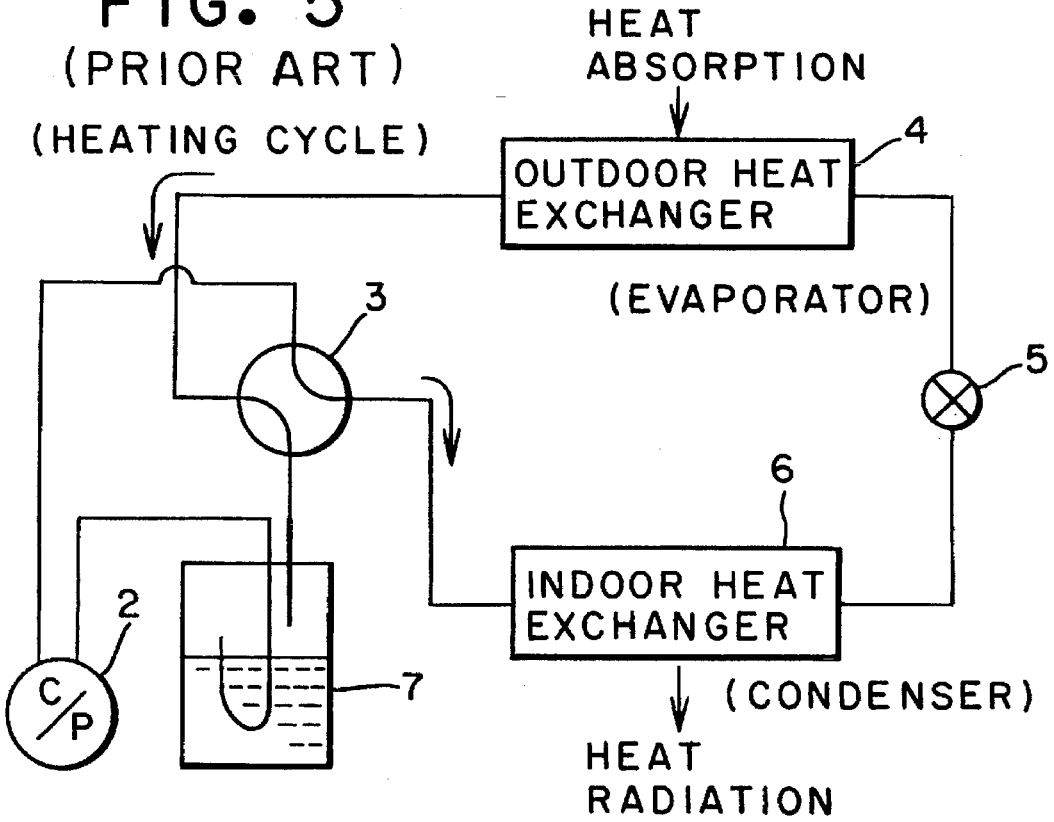
FIG. 5 (PRIOR ART) (HEATING CYCLE)

AIR CONDITIONER AND HEAT EXCHANGER THEREFOR

BACKGROUND OF THE INVENTION

This invention relates to an air conditioning system using a mixture of three types of refrigerants as a substitute for Freon.

The basic components of an air conditioning system 1 of the type currently in use will be described with reference to FIGS. 4 and 5.

The components of the air conditioning system 1 include a compressor 2, a four-way valve 3, an outdoor heat exchanger 4, an expansion valve 5, an indoor heat exchanger 6 and an accumulator 7. These components are provided in a refrigerating circuit. The accumulator 7 is for accumulating part of the refrigerant included in a low-temperature, low-pressure vapor-liquid present in a low-pressure line downstream of the expansion valve 5 immediately after start-up. The accumulator 7 makes it possible to prevent part of the refrigerant from being drawn into the compressor immediately after start-up.

In the cooling cycle, which is illustrated in FIG. 4, high-temperature, high-pressure gas is supplied from the compressor 2 to the outdoor heat exchanger 4, which serves as a condenser, via the four-way valve 3. The gas is condensed in the outdoor heat exchanger 4. The condensed phases are rendered into two phases, namely low-temperature, low-pressure gaseous and liquid phases, by the expansion valve 5. The result is supplied to the indoor heat exchanger 6, which serves as an evaporator, where evaporation takes place to produce a low-temperature, low-pressure gas. As a result, heat is absorbed from the interior of the room, thereby cooling the room. Finally, the low-temperature, low-pressure gas is returned to the compressor via the accumulator 7. Cooling of the interior of the room is carried out by repeating the cooling cycle described above.

In the heating cycle, which is illustrated in FIG. 5, high-temperature, high-pressure gas is supplied from the compressor 2 to the indoor heat exchanger 6, which serves as a condenser, via the four-way valve 3. The gas is condensed and converted to a high-temperature, high-pressure liquid in the indoor heat exchanger 6. As a result, heat is released into the room to warm the room. The high-temperature, high-pressure liquid is rendered into two phases, namely low-temperature, low-pressure gaseous and liquid phases, by the expansion valve 5. The result is supplied to the outdoor heat exchanger 4, which serves as an evaporator, where evaporation takes place to produce a low-temperature, low-pressure gas. The low-temperature, low-pressure gas is returned to the compressor 2 via the accumulator 7. Heating of the interior of the room is carried out by repeating the heating cycle described above.

Heretofore these cycles of the air conditioner have been implemented using Freon gas as the refrigerant. However, the use of Freon gas is now banned by reason of the fact that Freon causes global warming due to destruction of the ozone layer. Table 1 illustrates the specific types of Freon gas whose use is prohibited.

TABLE 1

| Symbol | Component | Tb (Boiling Point Under Atmospheric Pressure |
|---|---|---|
| CFC-11 | $CCl_3F$ | 23.7° C. |
| CFC-12 | $CCl_2F_2$ | −29.8° C. |
| CFC-113 | $CClF_2\text{-}CCl_2F$ | 47.6° C. |
| CFC-114 | $CClF_2\text{-}CClF_2$ | 3.6° C. |
| CFC-115 | $CClF_2\text{-}CF_3$ | −39.1° C. |

Much research has been conducted into gases which are substituted for Freon gas. New refrigerants have been developed upon taking into consideration that the refrigerant have characteristics that resemble those of Freon gas, that the refrigerant exhibit a Trb (critical temperature) at which vapor will not liquefy at a low Tb (boiling point under atmospheric pressure) and at high compression, and that the refrigerant having a high coefficient of performance and a high efficiency. [When the influential physical properties are ranked, we have the following: Cp (specific heat)>Tb (boiling point at atmospheric pressure)>Trb (critical temperature)>Pc (critical pressure)>Zc (critical compression coefficient).] The use of a mixed medium has become the focus of attention because Tb can be selected at will and because it is possible to improve upon drawbacks encountered in terms of the thermodynamic characteristics, solubility and combustion characteristics of the medium.

Mixed media can be classified into an azeotropic mixed medium and a non-azeotropic mixed medium. In an azeotropic mixed medium, the compositions of the gaseous and liquid phases do not change at the boiling point (which corresponds to Tb), and therefore the mixed medium behaves in the same manner as a single medium. An advantage of such mixed media is that the techniques and facilities established for a single medium can be utilized without modification. With a non-azeotropic mixed medium, on the other hand, the dew-point curve (cohesion curve) and boiling-point curve are separate over the entire composition range and therefore the compositions of the gaseous phase and liquid phase differ. The liquid phase is always rich in high-Tb media.

A mixed medium proposed thus far contains two or three components. An example of a two-component system is HCFC-22 ($CHClF_2$; Tb −40.8° C.) 45% and HCFC-142b ($CH_3CClF_2$; Tb −9.2° C.) 55%. However, such a mixed system has little practicality since it is dangerously combustible.

A patent relating to a mixed medium having three or more components disclosed by Dupont in January of 1989 skillfully mixes components having different values of Tb and combustibility to realize a behavior approximating that of an azeotropic mixed medium in practical terms. Three typical components are HCFC-22, HFC 152a ($CHF_2CH_3$; Tb −24.15° C.) and CFC-114 ($CClF_2CClF_2$; Tb −3.8° C.) or HCFC-124 ($CHClFCF_3$; Tb −12° C.). These are mixed at a weight ratio of 36:24:40, respectively, and the mixture is used as a medium for air conditioning.

With the above-described mixed medium as a background, the present invention uses the mixed medium of Table 2 below in an air conditioner.

TABLE 2

| Symbol | Chemical Component | Tb (°C.) | Proportion by Weight (wt- %) |
|---|---|---|---|
| R-32 | CH$_2$F$_2$ | −52.8 | 23 (or 30) |
| R-125 | CHF$_2$CF$_3$ | −48.6 | 24 (or 10) |
| R-134a | CH$_2$FCF$_3$ | −26.2 | 52 (or 60) |

The mixed medium shown in Table 2 uses R-134a instead of CFC-12, which is one of the specified Freon gases. The shortcomings that accompany use of R-134a, namely a decline in the refrigerant performance, diminished power from consumption and a reduction in weight flow rate, are compensated for by the addition of R-32 and R-125, which have a low Tb. Though this is not an azeotropic system, circulation of the low-Tb components is possible.

A first object of the present invention is to provide an air conditioner in which, by fully exploiting the characteristics of a mixed medium comprising the three components of R-32, R-125 and R-134a, namely by focusing upon the different boiling points of these components, it is possible to increase the gas components of R32 and R125 when the load on the air conditioner increases.

When a mixed medium comprising the three components of R-32, R-125 and R-134a is passed through the condenser of an air conditioning system which includes a refrigerator, the R-134a having the high boiling point is condensed at an early time. Two phases, namely a liquid phase rich in R-134a and a gaseous phase rich in R-32 and R-125, are produced in the piping of the condenser, as a result of which the efficiency of thermal transfer within the piping and radiation of heat from the piping walls declines. The increase in the gaseous phase reduces flow velocity through the piping and lowers the efficiency of condensation.

A second object of the present invention is to provide an air conditioner heat exchanger which solves these problems encountered in the prior art.

According to the present invention, the first object is attained by providing an air conditioner having a circuit connecting a compressor, a four-way valve, an outdoor heat exchanger, an expansion valve, an indoor heat exchanger and an accumulator, wherein a mixed medium of R-32, R-125 and R-134a is sealed within the circuit, a supercooled heat exchanger and a liquid-gas tank are arranged between the outdoor heat exchanger and the expansion valve and the liquid-gas tank is connected to the accumulator via a valve.

Owing to the difference in the boiling points of the three components constituting the mixed medium, R-32 and R-125 vaporize rapidly when the liquid phase is returned to the accumulator. This makes it possible for the compressor to draw in a large amount of the gaseous components. As a result, the compressor is capable of following up a change in load rapidly and efficiently.

According to the present invention, the second object is attained by providing a heat exchanger for an air conditioner which includes a refrigerator, arranged between a compressor and an expansion valve, for condensing a three-component mixed medium, the heat exchanger comprising a first condenser connected to the compressor, a liquid-gas separator connected to the first condenser, a second condenser for receiving a gaseous component within the liquid-gas separator, and a supercooled heat exchanger connected to a discharge port of the second condenser and an intake port of the expansion valve, a liquid component within the liquid-gas separator being supplied to an intake port of the supercooled heat exchanger.

Further, according to the present invention, the second object is attained by providing a heat exchanger for an air conditioner which includes a refrigerator, arranged between a compressor and an expansion valve, for condensing a three-component mixed medium, the heat exchanger comprising a first condenser connected to the compressor, a liquid-gas separator connected to the first condenser, and a second condenser for receiving a gaseous component within the liquid-gas separator, a liquid component within the liquid-gas separator being supplied to an intake side of the expansion valve.

In a preferred embodiment, the first condenser has piping diameter greater than that of the second condenser and the three-component mixed medium comprises R-32, R-125 and R-134a.

In operation, the liquid phase along the piping of the condensers is drawn off, the flow speed of high-pressure gas from the compressor is raised and the high-pressure liquid is compressed in the remaining portion of the piping. This makes it possible to improve the rate of contact heat transfer between the high-pressure liquid and the piping.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is an explanatory view illustrating a cooling cycle according to the prior art; and FIG. 5 is an explanatory view illustrating a heating cycle according to the prior art.

DESCRIPTION OF THE PREFERRED EMBODIMENTS

A first embodiment of an air conditioner 10 according to the present invention will be described in detail with reference to FIG. 1.

Figure 1:
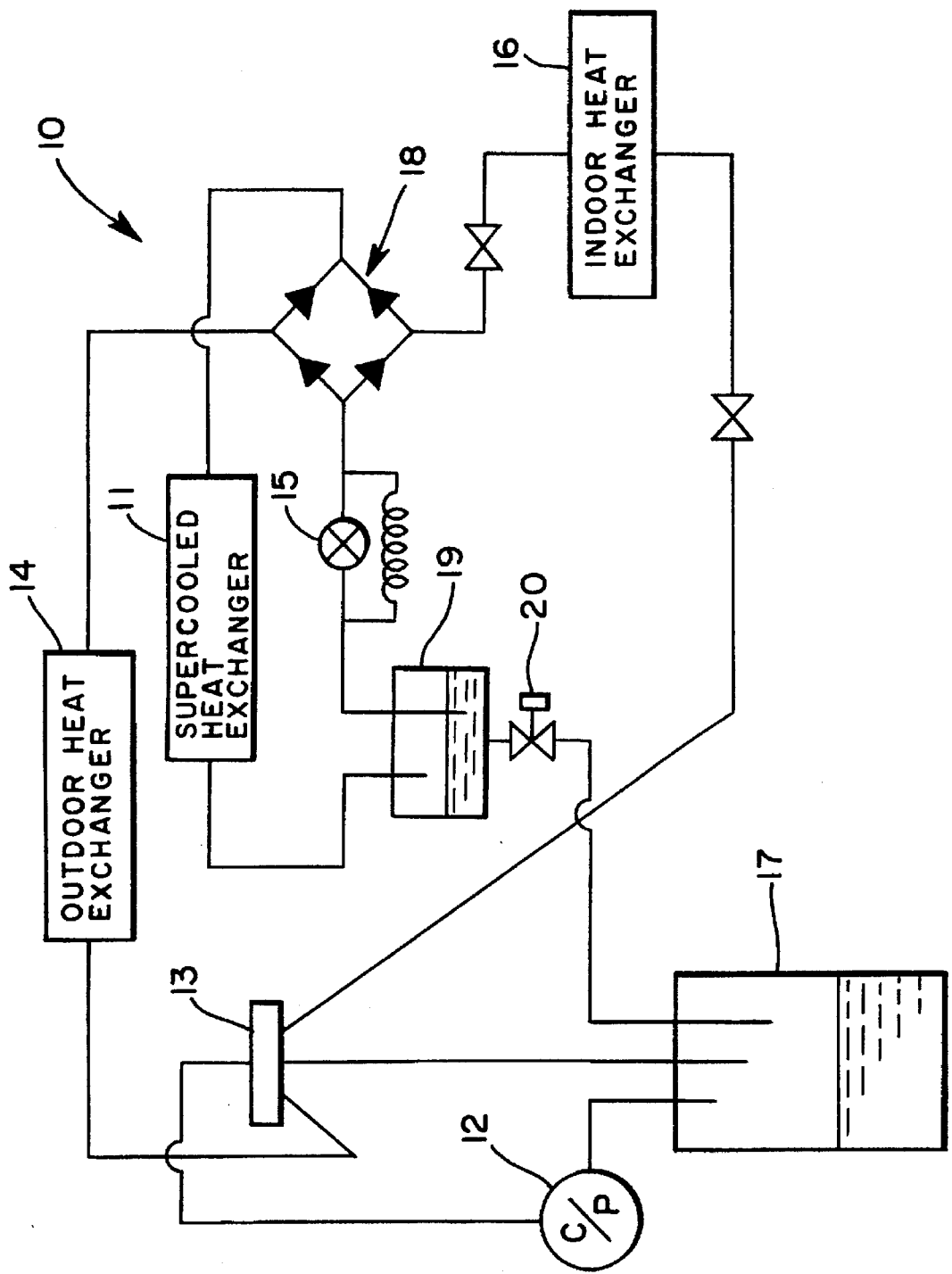
FIG. 1 is an explanatory view illustrating a first embodiment of the present invention.

As shown in FIG. 1, the air conditioner 10 includes a compressor 12 connected to an outdoor heat exchanger 14 via a four-way valve 13, and the outdoor heat exchanger 14 is connected to a supercooled heat exchanger 11 via a check valve set 18. The supercooled heat exchanger 11 is connected to an expansion valve 15 via a liquid-gas tank 19. The latter is connected to an accumulator 17 via a liquid injection valve 20. Opening the liquid injection valve 20 makes it possible to supply the liquid component of the liquid-gas tank 19 into the accumulator 17.

The expansion valve 15 is connected to an indoor heat exchanger 16 via the check valve set 18, and the indoor heat exchanger 16 is connected to the accumulator 17 via the four-way valve 13.

The cooling or refrigerating cycle will now be described. However, since the cycle is basically the same as that set forth earlier, part of the description will be redundant.

A high-temperature, high-pressure mixed medium of three components [R-32 (23%), R-125 (25%), R-134a (52%)] discharged from the compressor 12 enters the outdoor heat exchanger 14 via the four-way valve 13. Part of the medium is condensed while heat is given off. The condensed phase then enters the supercooled heat exchanger 11, where the mixed medium is completely liquefied. The liquid phase is rendered into two low-temperature, low-pressure phases, namely a gaseous phase and a liquid phase, by the expansion valve 15. The result flows into the indoor heat exchanger 16, where heat is absorbed and evaporation takes place to produce a low-temperature, low-pressure gas. This flows into the accumulator 17 via the four-way valve 13.

In the example of the cooling or refrigerating cycle shown in FIG. 1, part of the mixed medium liquefied by the supercooled heat exchanger 11 collects in the liquid-gas tank 19. When the refrigeration or cooling load increases, the liquid injection valve 20 is opened to return the liquefied mixed medium to the accumulator 17. The R-32 and R-125 exhibiting low boiling points are vaporized immediately so that a large quantity of gaseous components of R-32 and R-125 are produced within the accumulator 17, thus making it possible for the compressor 12 to draw in a large quantity of the gaseous phase having many R-32 and R-125 components. Thus, even if the refrigeration or cooling load becomes high, the high load can be dealt with in rapid fashion.

The heating cycle is substantially the same as that shown in the example of FIG. 5, with the indoor heat exchanger 16 serving as a condenser. Part of the condensed phase is liquefied by the supercooled heat exchanger 11 and the liquid phase collects in the liquid-gas tank 19. The remaining part of the liquid phase is rendered into gaseous phase via the expansion valve 15, outdoor heat exchanger 14 and four-way valve 13, Just as described earlier, and the result returns to the accumulator 17. When the heating load increases, the liquid injection valve 20 is opened to feed the liquid phase into the accumulator 17, where the R-32 and R-125 having the low boiling points are vaporized. This makes it possible for the compressor 12 to rapidly draw in the gaseous phase having many R-32, R-125 components. as a result of which the higher load is accommodated.

Thus, according to this aspect of the present invention, an increase in refrigeration, cooling or heating load can be dealt with by supplying the liquid phase to the accumulator 17 by means of the liquid injection valve 20, thereby increasing the gaseous phase component in rapid fashion. As a result, the compressor is operated efficiently so that a higher load can be accommodated quickly.

A second embodiment of the air conditioner 10 according to the present invention will now be described with reference to FIG. 2.

Figure 2:
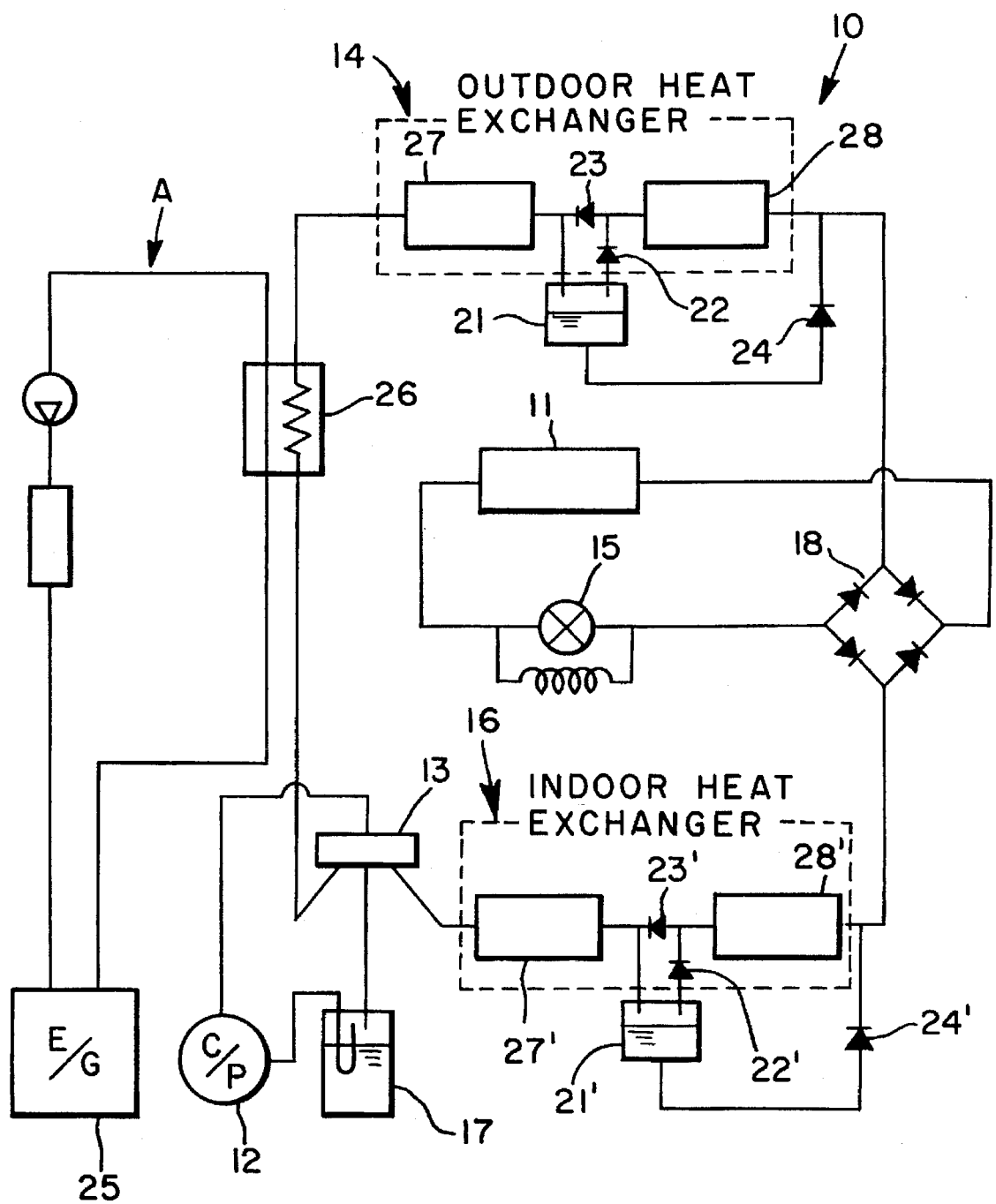
FIG. 2 is an explanatory view illustrating a second embodiment of the present invention.

As shown in FIG. 2, the compressor 12 is connected to the outdoor heat exchanger 14 via the four-way valve 13, and the outdoor heat exchanger 14 is connected to the supercooled heat exchanger 11 via the check valve set 18. The supercooled heat exchanger 11 is connected to the expansion valve 15. The expansion valve 15 is connected to the indoor heat exchanger 16 via the check valve set 18, and the indoor heat exchanger 16 is connected to the accumulator 17 via the four-way valve 13.

The outdoor heat exchanger 14 comprises a first condenser 27 and a second condenser 28 between which a liquid-gas separator 21 is interposed. The liquid phase condensed by the first condenser 27 flows into the liquid-gas separator 21 and is capable of being supplied to the intake side of the supercooled heat exchanger 11 via the check valve set 18. The gaseous phase in the liquid-gas separator 21 is fed to the second condenser 28, where the gaseous phase is condensed and then enters the supercooled heat exchanger 11 via the check valve set 18.

The indoor heat exchanger 16 comprises a first condenser 27' and a second condenser 28' between which a liquid-gas separator 21' is interposed. The liquid phase condensed by the first condenser 27' at the time of heating flows into the liquid-gas separator 21' and is capable of being supplied to the intake side of the supercooled heat exchanger 11 via the check valve set 18. Here the gaseous phase is condensed and then flows into the supercooled heat exchanger 11 via the check valve set 18.

The liquid phases in the liquid-gas separators 21, 21' may be fed to the intake side of the expansion valve 15 and the supercooled heat exchanger 11 may be deleted.

First and second check valves 22, 23 are interposed between the two condensers 27, 28 of the outdoor heat exchanger 14 and the liquid-gas separator 21. The first check valve 22 makes it possible to supply the gaseous phase from the liquid-gas separator 21 to the second condenser 28 only at the time of cooling, and the second check valve 23 makes it possible to supply both the liquid and gaseous phases from the second condenser 28 to the first condenser 27 only at the time of heating.

First and second check valves 22', 23' are interposed between the two condensers 27', 28' of the indoor heat exchanger 16 and the liquid-gas separator 21'. The first check valve 22' makes it possible to supply the gaseous phase from the liquid-gas separator 21' to the second condenser 28' only at the time of heating, and the second check valve 23' makes it possible to supply both the liquid and gaseous phases from the second condenser 28' to the first condenser 27' only at the time of cooling.

The liquid components of the liquid-gas separators 21, 21' are supplied to the side of the check valve set 18 via third check valves 24, 24', respectively.

In winter when heating is carried out in a low-temperature environment, the vaporizing performance of the outdoor heat exchanger 14 declines. Accordingly, waste heat from an engine 25 should be transmitted to the mixed medium via a heat exchanger 26 to assure the supply of the gaseous phase to the compressor 12.

The cooling or refrigerating cycle will now be described. However, since the cycle is basically the same as that illustrated in FIG. 4, part of the description will be redundant.

A high-temperature, high-pressure mixed medium of three components [R-32 (23%) (30 wt %), R-125 (25%) (10 wt %), R-134a (52%) (60 wt %)] discharged from the compressor 12 enters the outdoor heat exchanger 14 via the four-way valve 13. Condensation takes place while heat is given off.

In the condensation process, first a compressed phase which is rich in R-134a having a high boiling point is produced within the first condenser 27, the liquid phase collects in the liquid-gas separator 21, this is fed to the intake side of the supercooled heat exchanger 11 via the third check valve 24, and the gaseous component is fed into the second condenser 28 via the first check valve 22. There is no liquid phase in the piping of the second condenser 28, the flow speed is raised and the condensation processing is performed in an efficient manner.

The condensed phase then enters the supercooled heat exchanger 11, where the mixed medium is completely liquefied. The liquid phase is rendered into two low-temperature, low-pressure phases, namely a gaseous phase and a liquid phase, by the expansion valve 15. The result flows into the indoor heat exchanger 16, where heat is absorbed and vaporization takes place via the second condenser 28', the second check valve 23' and the first condenser 27' to produce a low-temperature, low-pressure gas. This flows into the accumulator 17 via the four-way valve 13.

The heating cycle is substantially the same as that shown in the example of FIG. 5, with the indoor heat exchanger 16 serving as a condenser.

In the condensation process, first a compressed phase which is rich in R-134a having the high boiling point is produced within the first condenser 27', the liquid phase collects in the liquid-gas separator 21', this is fed to the intake side of the supercooled heat exchanger 11' via the third check valve 24', and the gaseous component is fed into the second condenser 28' via the first check valve 22'. There is no liquid phase in the piping of the second condenser 28' and the flow speed is raised to perform the condensation processing in an efficient manner.

The condensed phase then enters the supercooled heat exchanger 11, where the mixed medium is completely liquefied. The liquid phase is rendered into two low-temperature, low-pressure phases, namely a gaseous phase and a liquid phase, by the expansion valve 15. The result flows into the outdoor heat exchanger 14, where heat is absorbed and evaporation takes place to produce a low-temperature, low-pressure gas. This flows into the accumulator 17 via the four-way valve 13.

The tubing diameter of the first condensers 27, 27' is made larger than that of the second condensers 28, 28. For example, if the tubing diameter of the former is 9.52 φ, then the diameter of the latter is made 6.35 φ.

The liquid-gas separators 21, 21' draw off the liquid phase along the piping of the condensers 14, 16 and condensation is performed while raising the flow speed through the slender piping of the second condensers 28, 28'. As a result, the mixed medium of three components having different boiling points can be condensed efficiently.

Figure 3:
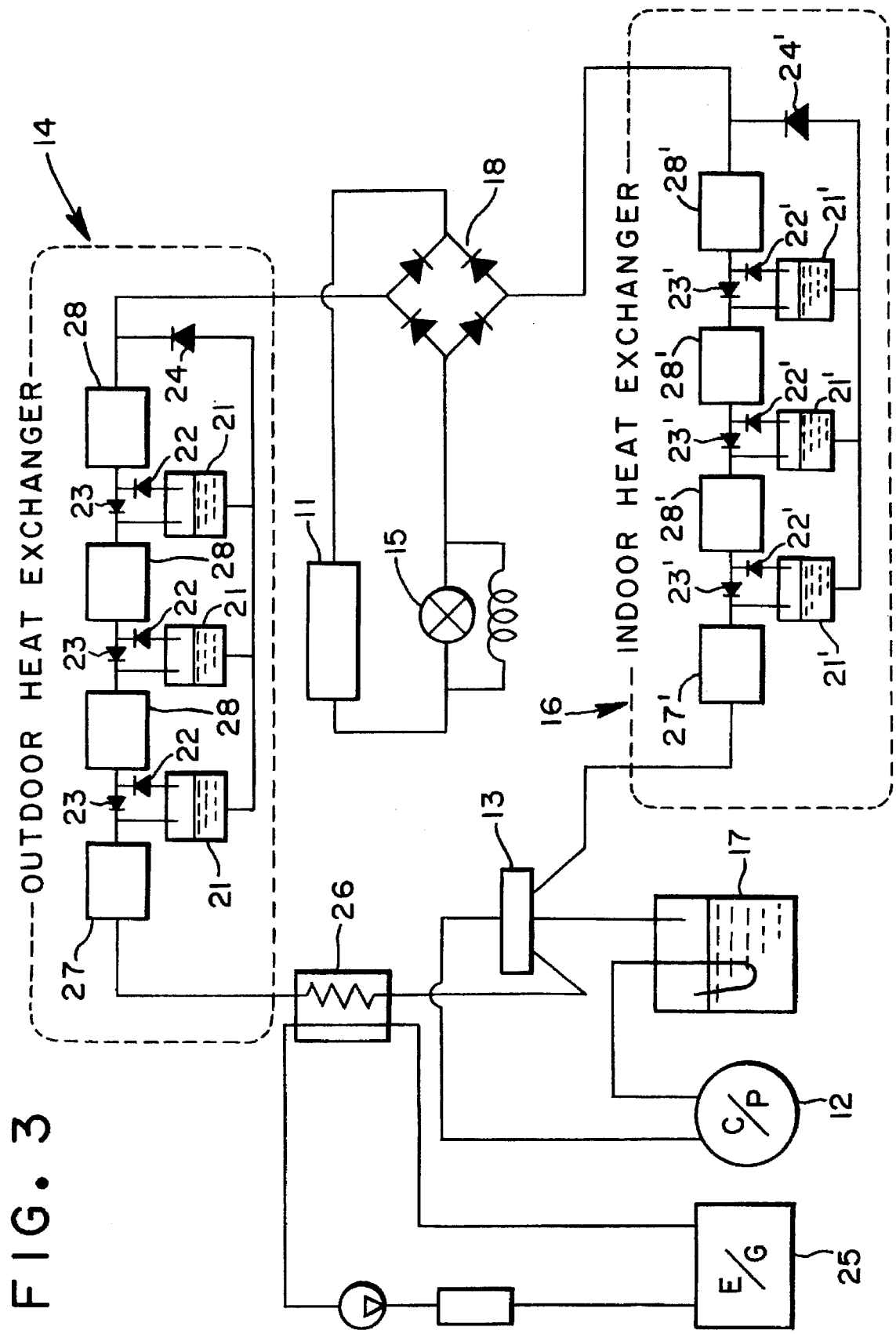
FIG. 3 is an explanatory view of an example of multiple-stage condensers.

In FIG. 3, a plurality of second condensers 28, a plurality of liquid-gas separators 21 and a plurality of first and second check valves 22, 23 are arranged serially within the outdoor heat exchanger 14, and a plurality of second condensers 28', a plurality of liquid-gas separators 21' and a plurality of first and second check valves 22', 23' are arranged serially within the indoor heat exchanger 16. In other aspects the construction is the same as that shown in FIG. 1. The plurality of second condensers 28, 28' cooperate with the plurality of liquid-gas separators 21, 21' to condense the gaseous phase of the mixed medium over a multiplicity of stages.

Thus, in accordance with this aspect of the present invention, the fact that the liquid phase is drawn off and condensation of the gaseous phase facilitated in the condensation process by the condensers makes it possible to lighten the load on the compressor and reduce the driving torque. In addition, the heat exchanger can be made small in size and cost can lowered.

As many apparently widely different embodiments of the present invention can be made without departing from the spirit and scope thereof, it is to be understood that the invention is not limited to the specific embodiments thereof except as defined in the appended claims.

What is claimed is:

1. An air conditioner comprising:

a compressor;

a four-way valve;

an outdoor heat exchanger;

an expansion valve;

an indoor heat exchanger;

an accumulator;

a circuit interconnecting said compressor, said four-way valve, said outdoor heat exchanger, said expansion valve, said indoor heat exchanger and said accumulator; and a supercooled heat exchanger and a liquid-gas tank arranged between said outdoor heat exchanger and said expansion valve, said liquid-gas tank being connected to said accumulator via a valve;

a mixed medium of R-32, R-125 and R-134a being sealed within said circuit.

2. The air conditioner according to claim 1, wherein said valve is opened at time of high load to supply a liquid phase in said liquid-gas tank to said accumulator to increase gaseous components of R-32, R-125, which have low boiling points, inside said accumulator.

* * * * *